United States Patent [19]

Anstey

[11] Patent Number: 4,907,670

[45] Date of Patent: Mar. 13, 1990

[54] SEISMIC EXPLORATION USING COMPRESSIONAL AND SHEAR WAVES SIMULTANEOUSLY

[76] Inventor: Nigel A. Anstey, 19 Coolidge Rd., Winchester, Mass. 01890

[21] Appl. No.: 337,750

[22] Filed: Jan. 7, 1982

[30] Foreign Application Priority Data

Jan. 20, 1981 [GB] United Kingdom ................. 8101575
Jan. 20, 1981 [GB] United Kingdom ................. 8101576

[51] Int. Cl.$^4$ ........................ G01V 1/04; H04R 11/00
[52] U.S. Cl. .................................... 181/121; 367/189
[58] Field of Search ............... 181/121, 113, 114, 106; 367/189, 75, 188, 41, 38, 49, 37, 39; 73/662, 667; 404/117

[56] References Cited

U.S. PATENT DOCUMENTS

| 2,354,548 | 7/1944 | Ricker | 367/75 |
| 3,185,250 | 5/1965 | Glazier | 181/121 |
| 3,224,252 | 4/1966 | Burns | 181/401 |
| 3,378,096 | 4/1968 | Cherry, Jr. | 367/75 |
| 3,886,493 | 5/1975 | Farr | 367/189 |
| 3,956,730 | 5/1976 | Barbier | 367/37 |
| 4,069,470 | 1/1978 | Cunningham et al. | 367/41 |
| 4,300,220 | 11/1981 | Goff et al. | 367/188 |
| 4,321,981 | 3/1982 | Waters | 181/114 |

OTHER PUBLICATIONS

"Reflection Seismology-a Tool for Energy Resource Exploration" 2nd Ed., Kenneth Waters, 1981, Appendix 3B and Chapter 12.1-2.

Primary Examiner—Thomas H. Tarcza
Assistant Examiner—Gregory C. Issing
Attorney, Agent, or Firm—Daniel H. Kane, Jr.

[57] ABSTRACT

In a method of seismic exploration using swept-frequency signals, compressional and shear waves are emitted simultaneously. Typically the waves are generated by swinging-weight vibrators acting through a single baseplate. If the frequency of the shear vibration is one-half that of the compressional vibration, the downward vertical forces can be phased to minimize the horizontal slippage of the baseplate. The sensitive axis of the geophones is inclined to the vertical for detecting both compressional waves and shear waves. For defined ranges of sweep rate, separate compressional and shear records are obtained by cross-correlating the geophone signal separately against the vertical and horizontal emissions.

7 Claims, 2 Drawing Sheets

SEISMIC EXPLORATION USING COMPRESSIONAL AND SHEAR WAVES SIMULTANEOUSLY

CROSS REFERENCE TO RELATED APPLICATIONS

This patent application is based upon British Patent Application Ser. No. 8101575 entitled "Seismic Exploration with a Swinging Weight Vibrator" and British Patent Application Ser. No. 8101576 entitled "Seismic Exploration Using Compressional and Shear Waves Simultaneously". Applicant filed these British applications in the United Kingdom on Jan. 20, 1981 and claims herein the convention priority date of these applications.

The present application is also related to U.S. patent application Ser. No. 337,749 filed 1/7/82 and entitled "Seismic Exploration with a Swinging Weight Vibrator".

1. Technical Field

This invention is concerned with seismic prospecting for oil, using compressional and shear waves simultaneously.

2. Background Art

Seismic prospecting by compressional (P) waves, using the Vibroseis system, has been established for many years. In this system a vibrator (usually of hydraulic type) applies an oscillating vertical force to a baseplate in contact with the ground, and radiates a signal whose frequency changes with time in a prescribed manner. Vertically-sensitive geophones detect the resultant movement of the ground, and cross-correlation of their outputs with the original swept-frequency signal yields a seismic reflection record of the standard form.

In recent years the system has been modified to use shear (S) waves. In this case the vibrator applies an oscillating horizontal force to the baseplate, and the geophones are horizontally sensitive. The wave motion employed is horizontally-polarized shear (SH) with the particle motion horizontally transverse to the line joining vibrator and geophones. SH waves travel with a velocity smaller than that of P waves. The ratio of velocities is expected to have lithological significance, and typically varies within the range 0.4 to 0.6. Despite this lower velocity, the SH wavelength is not significantly different from that of the P waves. This is because most of the agencies affecting attenuation in the earth are proportionately more severe for shear waves. Thus a seismic record might employ a frequency band of 10–100 Hz with P waves, but only 5–50 Hz with SH waves following as a separate operation.

A seismic reflector at a depth of 2000 m may be associated with an average P velocity (from the surface) of 4000 m/s. It would therefore appear at a time of 1 s. The same reflector may be associated with an average SH velocity of 2000 m/s. It would therefore appear at a time of 2 s. If the seismic section obtained with SH waves is displayed at half the time scale used for the P section, the reflections look very similar, both in position and apparent frequency content.

To the extent that a reflection can be correlated on the two sections, and positively ascribed to the same reflector, the ratio of reflection times gives the inverse ratio of average velocities. This ratio, being deemed diagnostic of the lithology, is valuable. The ratio of interval velocities, which is even more valuable, is similarly obtained from the difference in reflection times for the same pair of reflections on P and SH sections.

Much current seismic work, therefore, is done using both P and SH waves. However, since the P-wave method requires vertical vibrators and vertically-sensitive geophones, and the S-wave method requires horizontal vibrators and horizontally-sensitive geophones, the present field practice involves repetition of the recording work for the two methods. The cost is almost twice the cost of traditional work using P waves only.

Further, whereas P-wave vibrators can work along roads, current SH-wave vibrators cannot. They require to dig into the surface, and the damage they do to agricultural and other land must usually be repaired.

OBJECTS OF THE INVENTION

Accordingly, it is an object of the present invention to provide simultaneous recording of P and SH waves.

It is another object of the invention to generate both P and SH waves with an inexpensive vibrator, and to provide a mode of operation which allows the simultaneous use of a plurality of such vibrators.

It is a further object to provide a shear-wave vibrator which does not require to dig into the surface, and which can be used on roads.

A further object is to provide geophones which can be used for the simultaneous reception of P and SH waves.

DISCLOSURE OF THE INVENTION

These objects are realized by the simultaneous use of two vibrators, one configured to generate vertical P waves and one to generate horizontal SH waves. The vibrators may be swinging-weight vibrators acting through a single base plate. At any given time, the vibrators operate at different frequency. A preferred arrangement is for the SH vibrator to operate at half the frequency of the P vibrator. In this case, and if both vibrators drive the same baseplate, the maximum horizontal forces are generated when the downward vertical forces are at maximum. The tendency for horizontal slip of the vibrator is thereby minimized. The generated signals are received by geophones in which the sensitive element is inclined to the vertical so that the geophone detects both P and SH waves.

In the preferred form of the invention two swinging-weight vibrators are assembled for generating both vertical P waves and transverse SH shear waves through a single base plate. One swinging-weight vibrator comprises a pair of fly-wheels or rotors mounted for rotation in opposite directions on the common base plate. Weights are disposed eccentrically on the wheels and arranged to arrive at the highest and lowest points in phase, simultaneously. The opposing direction of rotation cancels the horizontal component of forces which would otherwise be transmitted to the base plate by the first set of fly-wheels or rotors of the vertical vibrator.

The other vibrator comprises a pair of rotors or flywheels mounted for rotation in opposite directions with eccentric weights disposed on the wheels and arranged to be in phase for arrival at the left-most and then right-most extremities in phase, simultaneously. The opposite direction of rotation of the fly-wheels of the second vibrator cancels the vertical component of the forces which otherwise would be transmitted to the base plate thereby providing transverse or horizontal shear wave excitation of the ground. Further, according to the preferred form the fly wheels or rotors of the horizontal or shear wave vibrator are double the diameter of the vertical vibrator fly wheels so that they rotate at half the frequency. As a result, the generated shear waves have typically half the frequency of the longitudinal vertical waves. The phases of the two vibrators are adjusted so that the maximum downward force of the vertical vibrator occurs simultaneously with the left most and right most forces of the horizontal vibrator. This phase relationship of the two vibrators minimizes the tendency for the vibrator to slip horizontally and minimizes the need for hold down weights.

Viewed as a method the invention contemplates conducting seismic exploration using swept frequency waves by generating compressional waves using a vertical vibrating means, generating shear waves of substantially half the frequency of the compressional waves using horizontal vibrating means, and coupling or transmitting said compressional waves simultaneously into the earth. The method further contemplates relating the phase of the compressional waves and shear waves so that the maximum left and right forces of the horizontally polarized shear waves coincide with the maximum downward forces of the compressional waves. According to further refinements of the method, the frequency of the compressional waves and shear waves respectively are swept or varied and the emission of a shear wave at the same particular frequency as a previously emitted compressional wave is delayed for a period of time to exceed the greatest reflection time of interest thereby avoiding spurious correlations. The frequency of sweep is carried out so that the time for emissions to pass through one octave exceeds the greatest reflection time of interest. The compressional wave and shear wave reflections are received simultaneously for correlation.

BRIEF DESCRIPTION OF THE DRAWINGS

The invention will now be described by reference to the drawings, in which.

BEST MODE FOR CARRYING OUT THE INVENTION

Although features of this invention are applicable to several types of vibrator, the following descriptive material concentrates on swinging-weight vibrators.

Companion U.S. patent application Ser. No. 337,749, concerned with P-wave generation, describes a development of the well-known swinging-weight vibrator shown diagrammatically in FIG. 1.

According to this development, the vibrator generates downsweeps, using the energy stored in a flywheel. Two similar units may be coupled in such a way that one unit is being driven up to speed while the other is emitting its downsweep. Control of eccentricity is provided to eliminate vibration from the unit being accelerated, and to permit greater output at selected frequencies. Alternatively, the same objects may be achieved by incorporating two vibrators in each unit, and by controlling the relative phase between them in the manner of U.S. Pat. No. 4,234,053 to Erich. A plurality of vibrating units may be used, in such a way that the times at which they radiate the same frequency are separated by at least the maximum reflection time of interest. Correlation is performed against a master sweep reconstituted from phase codes obtained from the vibrator, and the amplitude of the master sweep is adjusted as a function of frequency to provide any desired signal spectrum or signal-to-noise spectrum. A measure of automatic compensation is provided for resonance effects in the vibrator-ground coupling.

Figure 1:
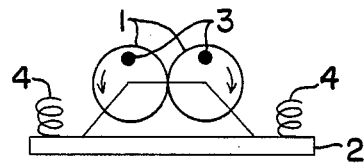
FIG. 1 represents a vertical swinging-weight vibrator of the prior art.

In FIG. 1 two rotors suggested diagrammatically by wheels 1 rotate in opposite directions, for example, by peripheral gearing, on a common baseplate 2. Weights 3 are disposed on the wheels, as shown, to be at their lowest and highest points simultaneously. This arrangement cancels the horizontal component of the forces transmitted to the baseplate, and provides a vertical P excitation of the ground. Phase codes to represent the position of the weights are derived from a transducer (not shown) on the shaft or wheel 1. Isolated hold-down weight may be provided at 4.

Figure 2:
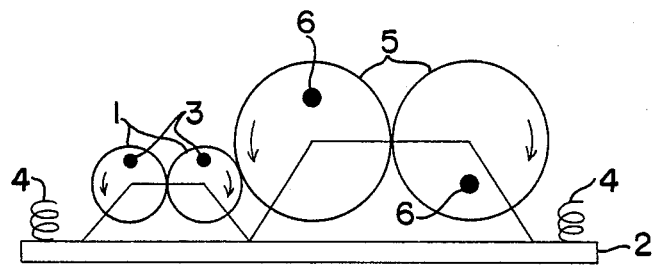
FIG. 2 represents a combined vertical and horizontal vibrator.

FIG. 2 shows, also in diagrammatic form, the development of the present invention. Wheels 1, together with their weights, mounting and drive, are counterparts of FIG. 1. Wheels 5 together represent a second vibrator on the same baseplate. They may be driven through the wheels 1 by the same circumferential gearing, and rotate in the directions shown. The wheels 5 are typically double the diameter of wheels 1, so that they rotate at half the frequency. The weights 6, in contradistinction to weights 3, are disposed to be at their rightward points simultaneously and hence their leftward points also. They may be larger than the weights 3.

From this it is apparent that the wheels 1 constitute a vertical vibrator and the wheels 5 constitute a horizontal vibrator, of typically half the frequency, acting on the same baseplate.

Figure 3:
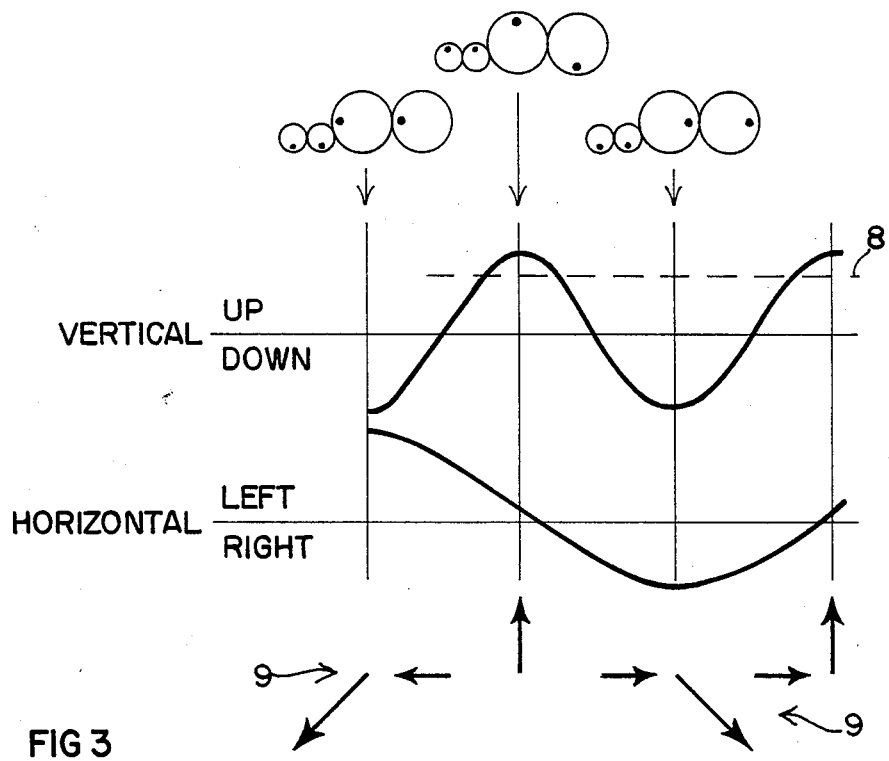
FIG. 3 shows the time variation of the vertical and horizontal forces, and of the resultant vector.

FIG. 3 illustrates the vertical and horizontal components of the force applied to the earth, as a function of the position of the rotating wheels. A sinusoidal vertical force of frequency f is applied by the small wheels. A sinusoidal horizontal force, in this case of frequency f/2, is applied by the large wheels, with phase such that both maximum forces, left and right, are developed at the time when the small wheels are generating maximum downward force. This phase is preferred since it minimizes the tendency for the vibrator to slip horizontally. For a given minimum coefficient of friction, the weights 6, and their eccentricity, can be selected so that the maximum horizontal force does not cause the baseplate to slip when simultaneously transmitting the maximum downward force. It is this feature which allows the vibrator to be used without damage to the surface on which it operates. This feature also minimizes the need for hold-down weight. It is even possible for the vibrator to leave the ground during the time of maximum upward force, as suggested by the dashed line 8, without significant loss of the horizontal output. The bottom line of FIG. 3 shows the direction of the resultant forces on the earth, as a function of time, by means of the vector arrows 9.

The geophones used with this system must be capable of detecting both P and SH waves. One possibility is to use conventional vertically-sensitive geophones for the P waves, and separate horizontally-sensitive geophones for the SH waves. The outputs of the two sets of geophones may be electrically combined, so that a single electrical signal is derived from each geophone station.

Figure 4A:
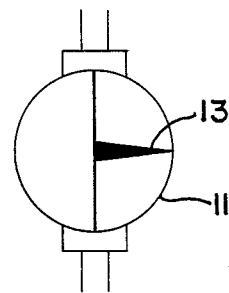
FIGS. 4A, 4B, and 4C are the diagrammatic plan view, end view, and side view respectively of a geophone configured to received P and SH waves simultaneously.
Figure 4B:
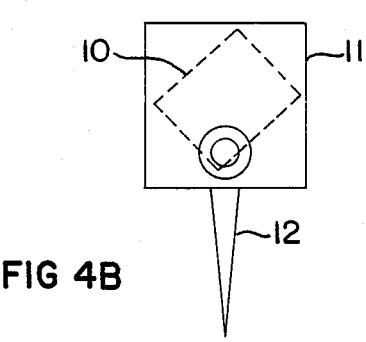
Figure 4C:
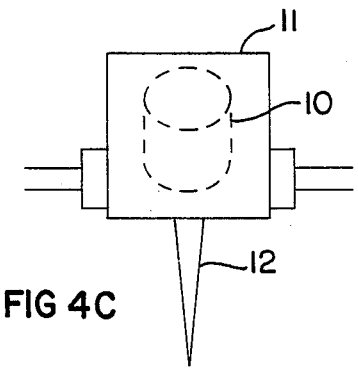

Alternatively, one geophone may be used to detect both P and SH. Such a geophone is illustrated in FIG. 4. The sensitive element 10 is inclined (typically at 45°) to the case 11 and the spike 12.

Any geophone used for SH waves must be aligned properly. Accordingly the top of the geophone bears a suitable mark 13 showing both the direction of the line between source and geophone, and the direction to the reference side of that line.

Although the sensitive unit 10 is basically conventional, spring modifications are desirable to minimize the adverse effects (particularly the distortion) introduced by the tilt.

Figure 5:
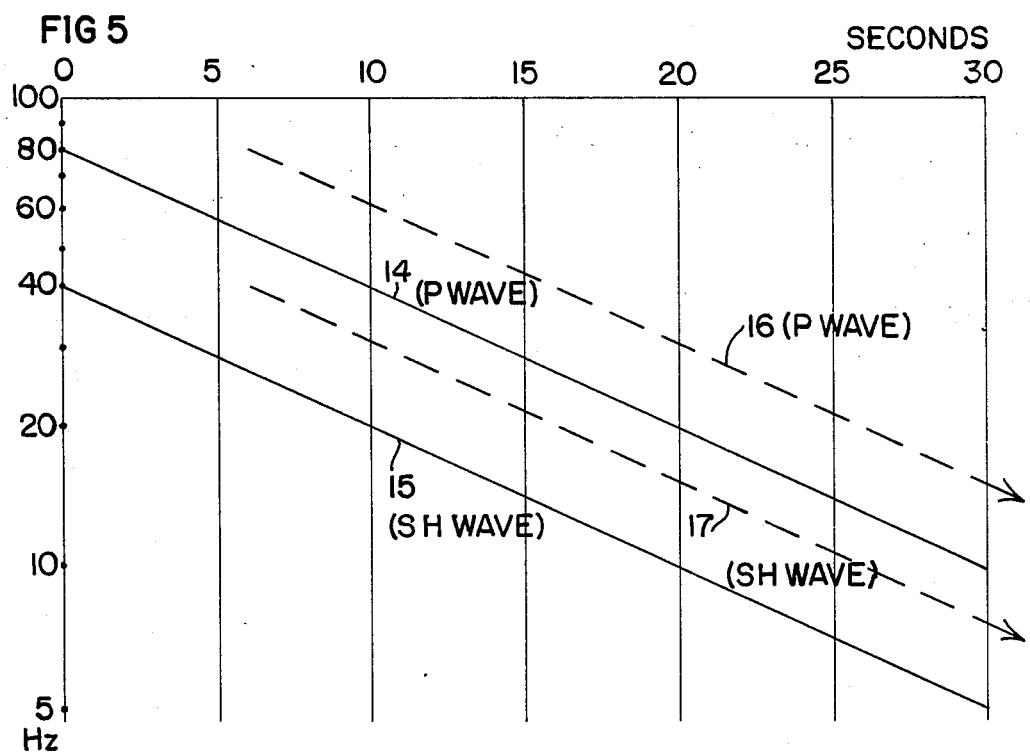
FIG. 5 illustrates a typical frequency-time relationship for the P and SH emissions.

The basic use of the described geophones and vibrators is as follows. The geophones are disposed in arrays along one or more lines, as in standard practice. The vibrator unit occupies successive vibrator positions, at each of which a succession of recordings is made. The motor accelerates the vibrator to a first desired speed, and the vibrator is then allowed to run down to a second desired speed. In so doing, it generates P and SH waves, with the P waves typically having double the frequency of the SH waves. FIG. 5 illustrates the rundown for the case where the first and second speeds represent a frequency range of 80–10 Hz for P waves and 40–5 Hz for SH waves, and where the rundown takes 30 seconds. The P-wave frequency as a function of time is shown at 14, and the SH-wave frequency at 15, both solid lines.

As described in more detail in the aforesaid companion application, a swept-frequency quasi-sinusoid may be reconstituted to represent the transmitted signal. In the present case, one such signal represents the transmitted P waves and another represents the transmitted SH wave. The received signals from the geophones are then correlated against each of these transmitted signals, to obtain two separate records, one P and one SH, each in its own frequency band. Thereafter the separate records may be subjected to various enhancement processes, as is normal in the art.

The maximum time shift used in the correlation represents the maximum reflection time of interest. For the case where this is 6 seconds, dashed lines 16 and 17 represent the frequency-time relations for the 6-second reflection. From this the following facts are evident:

a. There is no risk of a spurious correlation between P and SH waves, provided that the time taken for the vibrator unit to pass through any one octave is safely greater than the maximum reflection time of interest.

b. The same condition ensures that there is no spurious correlation within the reflection time of interest, for either P or SH separately, caused by the generation of second or higher-order harmonics in the vibrator-ground coupling.

c. There is a spurious correlation between the second harmonic of SH and the fundamental of P at the same reflection time. Since the swinging-weight vibrator unit as described generates very little second-harmonic distortion in the SH output, this spurious correlation is small. It is further reduced by the large absorption suffered by SH waves at the higher frequencies. Together, these facts offset the smaller geometrical spreading suffered by the SH reflection.

FIG. 5, therefore, represents a practical scheme where only one vibrator is in use at any time. This is likely to be the situation whenever the target is shallow, particularly in coal-mining and civil-engineering applications. For deeper targets it is desirable to use several vibrators simultaneously, and the companion application explains how this may be done. In the present context, multiple vibrators are permissible provided that the time between sweep-starts on any two vibrators safely exceeds the sum of the time to sweep through any one octave plus the maximum reflection time of interest. For the illustration of FIG. 5, this means that the sweeps generated by several vibrators must be separated by at least 16s. This is entirely reasonable when flywheels have sufficient energy to provide long sweeps.

Several other modifications of technique described in the companion application may also be used with the present invention, subject to conditions associated with sweep rate and maximum reflection time. Yet other modifications will be obvious to those skilled in the art, and these are encompassed within the scope of the invention. Specifically, these include the technique where an individual emission from one vibrator is restricted to less than one octave, so that each vibrator is optimized for a narrow frequency range, and where different narrow frequency ranges may be emitted sequentially or simultaneously.

Finally, it should be stressed that there are many advantages to the simultaneous recording of P and SH waves. One, mentioned earlier, is the cost. A second, realized partially when the two types of waves are generated at the same source and received by the same geophone, is the improved ease of correlation between P and SH reflections. In prior practice, this correlation was often difficult. The problem is much eased by the certain knowledge that the reflection path is identical for the two waves. Thus studies of relative attenuation become more meaningful, phase changes associated with minor differences of field layout are eliminated, and the irksome problem of the near-surface corrections is simplified by the certainty of identical coupling and surface consistency.

The embodiments of the invention in which an exclusive property or privilege is claimed are defined as follows:

1. In the technique of seismic exploration using swept-frequency compressional waves and swept-frequency horizontally-polarized shear waves, the improved method in which the said compressional waves and shear waves are emitted simultaneously from vertical and horizontal vibrators coupled to a single baseplate; in which the frequency of the horizontal vibrator is one-half that of the vertical vibrator; and in which the relative phase of the vertical and horizontal vibrators is arranged so that the maxima of the horizontal forces generated by the horizontal vibrator occur at the time of the maxima of the downward vertical forces generated by the vertical vibrator.

2. The method of claim 1, in which the said vertical and horizontal vibrators are swinging-weight vibrators.

3. The method of claim 1, in which the said compressional waves and horizontally-polarized shear waves are detected by geophones having a single sensitive element whose axis of sensitivity is inclined to the vertical in a vertical plane substantially perpendicular to the line joining the wave source and the geophone.

4. A vibrator providing simultaneous emission of compressional and horizontally polarized shear waves according to the improved method of claim 1, comprising in combination:
   a. a first pair of contra-rotating eccentric weights phased to generate a sinusoidal vertical force;
   b. a second pair of contra-rotating eccentric weights phased to generate a sinusoidal horizontal force;
   c. a single baseplate means operatively coupling both the vertical and horizontal forces to the earth;
   d. gear means operatively coupled to drive the second pair of weighs at one-half the frequency of the first pair of weights;
   e. phasing means operatively coupled between the first and second pairs of weights such that the maxima of horizontal force occur substantially at the time of the maximum downward vertical force.

5. A method of seismic exploration using swept-frequency waves, comprising:
   generating compressional waves at the output of vertical vibrator means mounted on a baseplate;
   simultaneously generating horizontally-polarized shear waves having half the frequency of the compressional waves at the output of horizontal vibrator means mounted on the same baseplate;
   relating the phase of the horizontal and vertical vibrator means so that each maximum of horizontal force imparted by the horizontal vibrator means generating shear waves substantially coincides with a maximum of downward vertical force imparted by the vertical vibrator means generating compressional waves;
   recording separate output signals corresponding to the compressional and shear waves emitted by said vertical and horizontal vibrator means;
   receiving the reflections of said compressional and shear waves and generating corresponding reflection signals;
   cross-correlating the received reflection signals separately against the said output signals from the vertical and horizontal vibrator means;
   thus obtaining separate reflection signals for compressional waves and for shear waves; and recording the results.

6. The method of claim 5, further providing that the time for the swept-frequency emissions to pass through any one octave exceeds the greatest reflection time of interest.

7. The method of claim 5 wherein the step of receiving reflections comprises detecting the reflections of the compressional and shear waves simultaneously using a geophone having a single sensitive element whose sensitive axis is inclined to the vertical in a vertical plane substantially at right angles at a line joining the vibrator means and said geophone.

* * * * *